(12) United States Patent
Weinecke et al.

(10) Patent No.: US 7,101,463 B1
(45) Date of Patent: Sep. 5, 2006

(54) CONDENSATION AND RECOVERY OF OIL FROM PYROLYSIS GAS

(75) Inventors: Michael H. Weinecke, Franklin, WI (US); Robert J. Unterweger, Nashota, WI (US)

(73) Assignee: Metso Minerals Industries, Inc., Milwaukee, WI (US)

( * ) Notice: Subject to any disclaimer, the term of this patent is extended or adjusted under 35 U.S.C. 154(b) by 0 days.

(21) Appl. No.: 09/959,088

(22) PCT Filed: Apr. 28, 2000

(86) PCT No.: PCT/US00/11627

§ 371 (c)(1),
(2), (4) Date: Oct. 17, 2001

(87) PCT Pub. No.: WO00/68338

PCT Pub. Date: Nov. 16, 2000

Related U.S. Application Data

(60) Provisional application No. 60/132,634, filed on May 5, 1999.

(51) Int. Cl.
*B01D 5/00* (2006.01)

(52) U.S. Cl. .......................... 201/30; 202/152; 202/153; 202/154; 202/155; 202/156; 202/157; 202/158; 202/182; 202/266; 585/204

(58) Field of Classification Search ................ 585/240; 261/19, 20, 24, 27, 52, 61, 78.1, 94, 97, 117, 261/98, 115; 201/30; 202/152–158, 182, 202/266

See application file for complete search history.

(56) References Cited

U.S. PATENT DOCUMENTS

| 4,053,369 A | * | 10/1977 | Cines .......................... 203/52 |
| 4,647,443 A | | 3/1987 | Apffel ........................ 423/449 |
| 5,731,483 A | * | 3/1998 | Stabel et al. ................ 585/241 |

FOREIGN PATENT DOCUMENTS

| DE | 1944383 | 3/1970 |
| DE | 4324112 | 2/1995 |
| DE | 4410672 | 9/1995 |
| EP | 0823469 | 2/1998 |
| WO | WO 98/02504 | 1/1998 |

* cited by examiner

*Primary Examiner*—Glenn Caidarola
*Assistant Examiner*—Alexis Wachtel

(74) *Attorney, Agent, or Firm*—Andrus, Sceales, Starke & Sawall, LLP

(57) ABSTRACT

A system and process for the recovery of oil from the pyrolysis of material containing hydrocarbons such as shredded vehicle tires. The system utilizes a pair of sequentially positioned packed towers to recover at least 95% of the oil contained in the pyrolysis gases. The first packed tower operates above the dew point of the water vapor in the pyrolysis gases to insure that no water is condensed and obtain a primary oil fraction having oil with a high flash point of about 60° C. or greater and a primary vapor fraction containing additional oils, fuel gases and water vapor. The primary vapor fraction is fed to the second packed tower which operates below the dew point of the water vapor to condense the water and oil having a low flash point of 34° C. or below, and provide a secondary vapor fraction containing valuable fuel gases.

12 Claims, 2 Drawing Sheets

CONDENSATION AND RECOVERY OF OIL FROM PYROLYSIS GAS

CROSS-REFERENCE TO RELATED APPLICATIONS

This application is the U.S. national stage application of International Application PCT/US00/11627, filed Apr. 28, 2000, which international application was published on Nov. 16, 2000 as International Publication WO 00/68338 in the English language. The International Application claims priority of U.S. Provisional Patent Application 60/132,634, filed May 5, 1999.

BACKGROUND OF THE INVENTION

The present invention relates generally to the recovery of usable products from the pyrolysis of material containing hydrocarbons. More specifically, the present invention relates to the recovery of oil from the gas formed when scrap tires are pyrolysed.

As the supply of available landfill space decreases, environmentally sensitive disposal of consumed vehicle tires presents an ever increasing problem. In the United States alone, over 280,000,000 vehicle tires are scrapped and shipped to landfills each year. Although some of the used vehicle tires are recycled to be used in pavement and others are burned as boiler fuel, more than 80% of used vehicle tires end up being deposited in landfills. Discarding vehicle tires in landfills has been recognized as a significant waste of a recyclable resource. For many years, it has been known that used vehicle tires can be recycled by pyrolysis to obtain valuable by-products that can be sold and reused. Pyrolysis, generally speaking, is a thermal distillation or decomposition of a substance, especially one containing hydrocarbons. In the case of used vehicle tires, this process is carried out in the absence of oxygen and at temperatures generally between 500° C. and 800° C.

The process of decomposing used tires by pyrolysis allows the recovery of substantial amounts of oil, gas, carbon black and steel. Many different processes have been designed to recover these valuable products produced by pyrolysis, and the various techniques known for recovering these products each have their own unique and difficult problems. For example, the recovery of oil formed when scrap tires are pyrolysed has always been a challenge. Oil is typically produced by condensation of pyrolysis gas produced in the pyrolysis reactor, but these gases typically also include particulate matter, primarily carbon dust and glass fibers, which also are driven off from the scrap tires when pyrolysed. This particulate matter accumulates in fittings, vents and flame arresters, which eventually obstruct passages. In the past, particulate matter in the pyrolysis exhaust gas has been removed in a cyclone. However, if oil cools prematurely and begins to condense in the cyclone, the condensed oil will provide a surface for the particulate matter to adhere to. This not only may result in obstructions in the cyclone, but may also result in poor separation performance for the cyclone as it causes undesirable changes to inherent design parameters of the cyclone. In addition, if a packed bed condenser is employed in the system, particulate matter can foul the packing thus blocking off the open area and causing an intolerable rise in the pressure drop across the bed.

Another of the difficulties presented when recovering oil is caused by the fact that in addition to the oil vapors generated in the pyrolysis reactor, water vapor is also carried with the oil vapor. It is often the case with pyrolysis oil that it has a specific gravity close to that of water. As a result, if water and such oil are condensed together, they can form an emulsion that is difficult to separate.

SUMMARY OF THE INVENTION

The present invention is a process for the recovery of oil from the pyrolysis of material containing hydrocarbons such as shredded vehicle tires. The process of the present invention not only recovers substantial amounts of pyrolysis oil, put also solves the problems noted above which occur in the prior art.

The distribution of the carbon black, oil and gases recovered from the pyrolysis of scrap tires is influenced by the temperature at which the pyrolysis occurs. It is well known that at higher pyrolysis temperatures gas generation is favored over oil generation. The present description assumes a breakdown of the tire into 32.4% carbon black, 12% steel and 55.6% oil and non-condensable gases. Of the oil and non-condensable gases, about 50% goes to liquid oil and the remaining 50% is non-condensable gases. Of the liquid oil, about 80% is collected in the first or primary condenser and about 20% in the second or secondary condenser.

Hot gases from a pyrolysis process, for example a rotary kiln processing used tires, are taken to a first oil condenser. The first oil condenser comprises a packed tower with countercurrent gas/liquid flow. Various types of packing material may be used, but the preferred packing is of the Pall ring type that has high surface area and high void fraction. Cooled oil is sprayed onto the top of the packed bed and is used to cool, condense and coalesce the vapor in the incoming gas stream. By controlling the temperature and flow rate of the cooled oil and the size of the packed tower, the temperature of the gas leaving the tower can be controlled. Preferably, the temperature of the gas leaving the tower should be above the dew point of the water vapor in the gas stream. A temperature of 100° C.–105° C. is used to insure that no water is condensed in the first oil condenser. By preventing the condensation of water in the first condenser, an undesirable oil/water emulsion which is difficult to separate is not obtained.

To prevent fouling of the packing in the first oil condenser, a spray of cool oil is also directed at the underside of the packing. In this manner, the particulate matter in the incoming gas stream will adhere to the lower surface of the packing which is coated with the upwardly directed oil spray. In addition, the spray on the underside of the packing keeps the particulate matter from remaining on the packing because it is washed off as the spray from the topside of the packing passes through the packing and is collected with the oil in the sump of the first condenser. The oil collected in the sump of the first condenser is drawn from the sump through a wire mesh duplex filter. The filter collects the larger particulate matter containing the oil and removes it from the process. This prevents the particulate matter from clogging the oil spray nozzles. After the filter, a pump moves the oil through a water-cooled liquid-to-liquid heat exchanger. The cooler oil returns to the first condenser where it is used to spray onto the topside and underside of the packed bed, as previously described. A portion of the oil, equal to that condensed in the tower, is removed and is the oil product from the process. The spray nozzles used in the condenser are single fluid atomization nozzles that contain relatively large nozzle openings, i.e. 3/16 in. or larger, to help prevent clogging of the nozzle.

From the first oil condenser, the gases go to a second oil condenser. This second condenser operates in a similar manner to the first condenser except that the gases are cooled below the dew point of water contained in the incoming gas stream. As a result, both water and oil are collected in the sump of this condenser. However, the oil collected in the sump of the second condenser typically has a specific gravity of 0.90 to 0.95. Since the oil is significantly less dense than the water collected with it, separation of the oil and water phases may be readily accomplished. The second condenser also only requires an oil spray on the topside of the packing and does not require an oil spray directed at the underside of the packing since a large majority of the particulate matter is removed in the first stage. Again, a portion of the oil, equal to that condensed in the tower, is removed as oil product from the process.

As a result, the process of the present invention enables the recovery of greater than 95% of the oil entrained in the initial hot gas exhaust stream from the pyrolysis reactor. This oil may comprise both a high boiling pyrolysis oil (flash point of 60° C. or greater) as well as a low boiling pyrolysis oil (flash point of 34° C. or below). In addition, a gas is produced from the second condenser which is readily usable as fuel gas having minimal amounts of condensable vapors therein.

BRIEF DESCRIPTION OF THE SEVERAL VIEWS OF THE DRAWING

The drawings illustrate the best mode presently contemplated of carrying out the invention.

In the drawings.

DETAILED DESCRIPTION OF THE INVENTION

Figure 1:
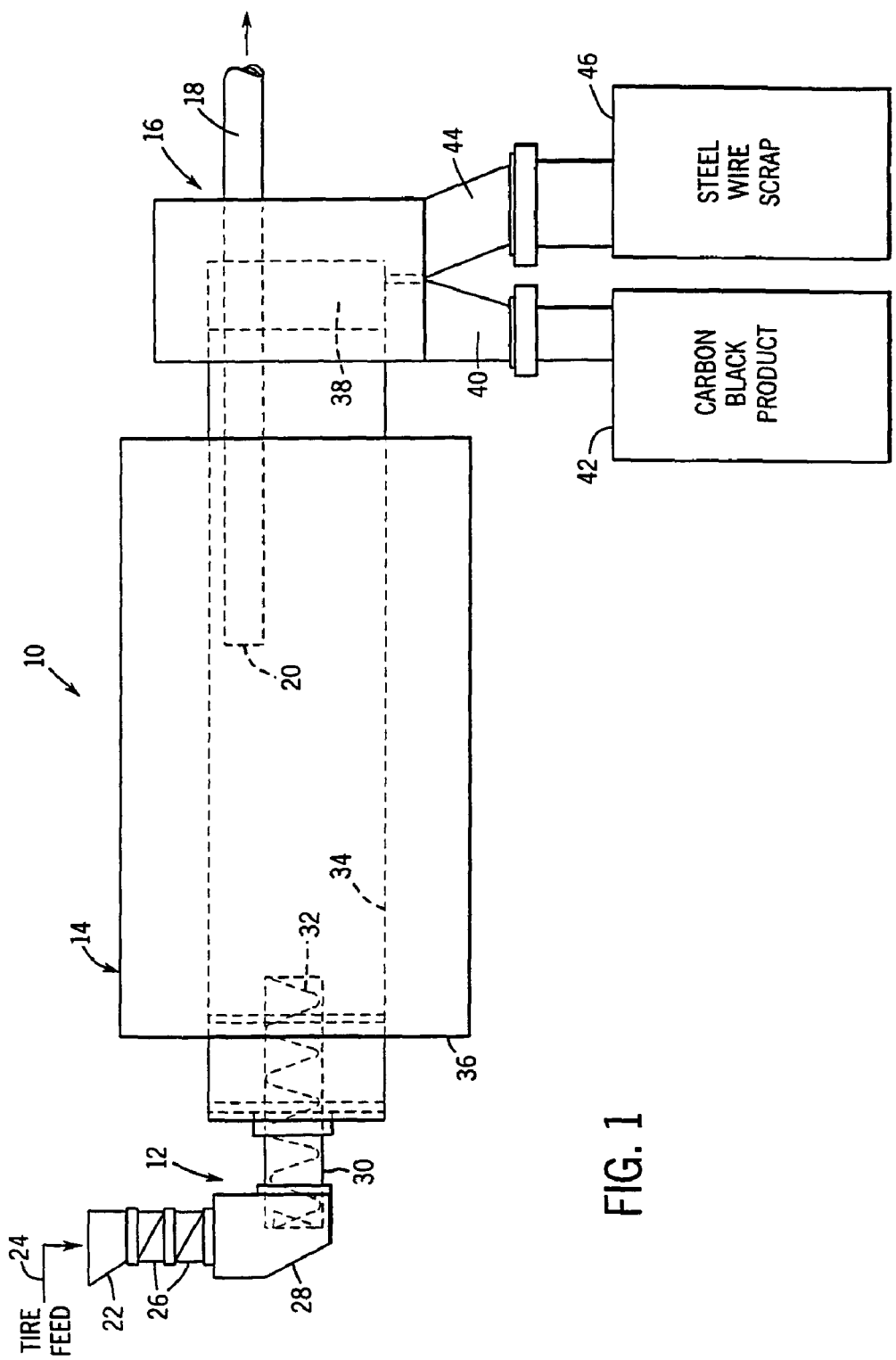
FIG. 1 is a schematic illustration of a typical pyrolysis system for producing desirable materials such as oil, gas, char and steel wire from shredded vehicle tires.

FIG. 1 generally illustrates a pyrolysis system 10 which provides a source of pyrolysis gas used in the present invention. The pyrolysis system 10 operates to receive a supply of shredded vehicle tires, and through pyrolysis, convert the shredded vehicle tires into desirable materials, such as oil, gas, steel wire, and char containing carbon black.

The pyrolysis system 10 generally includes an in-feed section 12, a pyrolysis section or reactor 14 and a separating section 16. The vehicle tire pieces are initially fed into the in-feed section 12 which in turn feeds the vehicle tire pieces into the pyrolysis section 14. As the vehicle tire pieces move through the pyrolysis section 14, hydrocarbons contained within the vehicle tire pieces are driven off as exhaust gases. Specifically, the gases are removed from pyrolysis section 14 via a gas discharge pipe 18 having an inlet port 20 positioned within pyrolysis section 14. The remaining portions of the vehicle tires after pyrolysis are desirable materials such as char and steel wire. Upon leaving the pyrolysis section 14, the char and steel wire are fed into the separating section 16 where they are separated into distinct end products. After separation, these desirable end products can then be processed downstream from the pyrolysis system 10 in accordance with known practices and eventually sold or reused.

Referring now to FIG. 1, the vehicle tire pieces are initially fed into a hopper 22 as illustrated by arrow 24. The vehicle tire pieces can be formed upstream from the hopper 22 by conventional shredding techniques (not shown) or can be shipped from a remote tire shredding facility. Typically, used vehicle tires are shredded into individual pieces each having a maximum size of approximately 4 inches. The vehicle tire pieces are fed by conventional conveyor techniques to the intake end of hopper 22. A pair of dump valves 26 are positioned within hopper 22 and function as an air interlock since the pyrolysis reaction that takes place within the pyrolysis section 14 must occur in the absence of air. After sequentially passing through dump valves 26, the scrap tire pieces fall into feed chamber 28. Thereafter, the tire pieces are fed via a rotatable cylinder 30 containing a screw-like internal flight 32 which acts as an Archimedes screw to transport the supply of vehicle tire pieces from chamber 28 into pyrolysis section 14.

Pyrolysis section 14 generally includes a rotary kiln 34 that extends through an insulted furnace 36. The rotary kiln 34 is rotatable about its longitudinal axis and is inclined such that the in-feed end is above the discharge end resulting in gravity flow of vehicle tire pieces between its in-feed end and its discharge end, as is conventional. The furnace 36 surrounds the rotary kiln 34 and includes a plurality of individual burner assemblies (not shown) that operate to heat the rotary kiln 34, as is conventional. Kiln 34 is generally heated to temperatures between 500° C. and 800° C. The high operating temperature of kiln 34 causes the vehicle tire pieces to be rapidly heated, which promotes cracking and vaporizes the light hydrocarbon fractions contained within the vehicle tire pieces. The vaporized hydrocarbon fractions are released as discharge exhaust gases into the open interior of rotary kiln 34 and then outwardly through gas discharge pipe 18.

The discharge end of rotary kiln 34 extends from furnace 36 and enters into the separating section 16, as shown in FIG. 1. The discharge end of kiln 34 includes a trommel 38 which functions to separate the char material from the steel wire exiting pyrolysis section 14. Trommel 38 includes slots (not shown) sized to permit char to pass therethrough while being small enough to prevent a substantial amount of the steel wire from passing therethrough. The char separated from the product flow by trommel 38 passes through the slots in trommel 38 and into a char chute 40 and then into a collection bin 42. The separated char within bin 42 can then be processed downstream by conventional techniques to produce a commercial grade carbon black that can be utilized for various known functions.

The steel wire that remains in the product flow from trommel 38 then passes through wire chute 44 and into a wire collection bin 46. The steel wire collected in bin 46 is then processed downstream by conventional techniques to produce desirable products.

Figure 2:
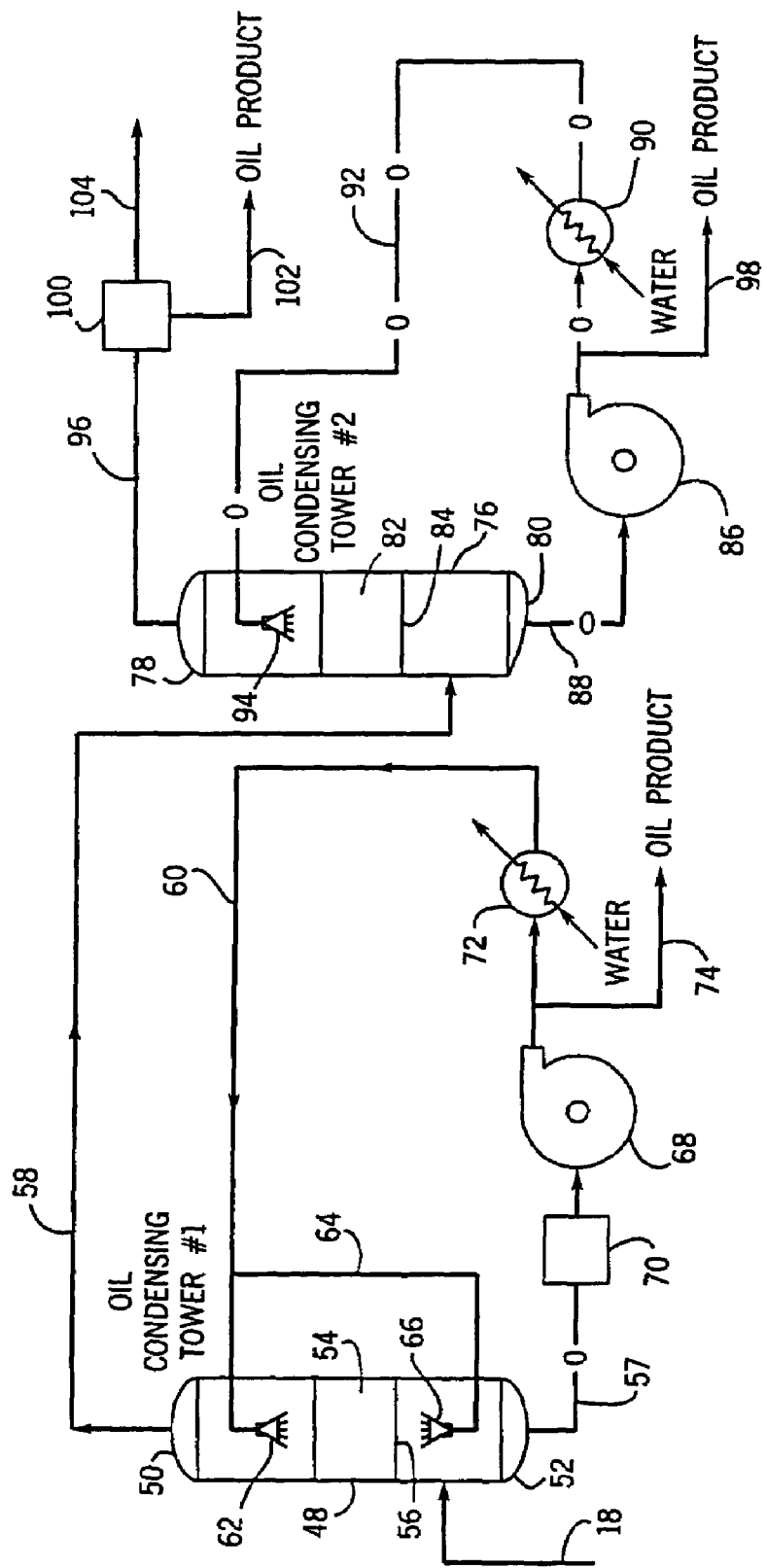
FIG. 2 is a schematic illustration of the oil recovery system of the present invention used to condense and collect oil from the pyrolysis exhaust gas produced in the system of FIG. 1.

Referring now to FIG. 2, gas discharge pipe 18 extends from the interior of rotary kiln 34, and is typically connected to a source of negative pressure (not shown). The source of negative pressure acts to draw the expelled exhaust gases out from the interior of kiln 34. These expelled gases contain valuable hydrocarbon fuel gases, condensable oil, small quantities of steam (water vapor), and entrained solid particulate matter.

The gases removed by discharge pipe 18 are then subject to downstream processing via the recovery system illustrated in FIG. 2. As shown, gas discharge pipe 18 feeds the hot gases into a first or primary oil condenser 48. Oil condenser 48 is in the form of a cylindrical tower having an upper end 50, a lower end or sump 52, and a central portion filled with conventional packing 54. Packing 54 is in the form of discrete particles, and in particular are in the form of Pall rings having high surface area and high void fraction. The packing 54 is supported within condenser 48 via a screen 56, as is conventional. Discharge pipe 18 feeds the hot pyroylsis gases into the lower section of condenser 48 below screen 56 and above sump 52. These hot gases enter condenser 48 at a temperature of between about 400° C. to 800° C., rise through packing 54, are cooled and then exit the upper end 50 of condenser 48 at a temperature of between about 100° C. to 105° C. via line 58.

Relatively cool oil is used to cool the hot gases passing through packing 54. This is accomplished by spraying cooled oil onto the top of packing 54 via line 60 and nozzle 62. Thus, a countercurrent gas/liquid flow is used to cool, condense and coalesce the vapor in the incoming gas stream passing upwardly through packing 54. Tower 48 separates the incoming pyrolysis gases into a primary oil fraction containing condensed oil and particulate matter, and a primary vapor fraction containing oil, hydrocarbon fuel gases and water vapor. By controlling the temperature and flow rate of the cooled oil and the size of the packed tower 48, the temperature of the gas leaving condenser 48 can be controlled. Preferably, it is desirable to control this temperature to be above the dew point of the water vapor in the gas stream. Thus, a temperature of about 100° C. to 105° C. is preferred to insure no water is condensed in condenser 48. By preventing the condensation of water in the first condenser 48, an undesirable oil/water mixture is not obtained in the material collected in sump 52. Since the condenser 48 is operating at a temperature above the dew point of water vapor in the gas stream in pipe 18, the oil being collected in sump 52 has a relatively high flash point and might be considered high boiling pyrolysis oil, i.e. having a flash point of about 60° C. or higher and is typically between about 60° C. and about 90° C., and preferably about 60° C.

To prevent fouling of packing 54, a spray of cool oil is also directed upwardly toward the underside of packing 54 via line 64 and nozzle 66. Since particulate matter in the hot gas will adhere to the first surface it contacts, the underside oil spray causes this matter to adhere to screen 56 and/or the lowest layer of packing 54. Then, the topside oil spray keeps this particulate matter from remaining on or permanently adhering to packing 54 and/or screen 56. Instead, the particulate matter is washed off as the oil sprayed onto the top of packing 54 flows through packing 54 and is collected in sump 52. Thus, the oil in sump 52 includes particulate matter as well as the high boiling pyrolysis oil having a flash point above 60° C.

The oil collected in sump 52 of condenser 48 is drawn from sump 52 via line 57 by pump 68 through a filter 70 which collects the larger particulate matter contained in the oil and removes it from the system in order to prevent the particulate matter from clogging the oil spray nozzles 62 and 66. Preferably, filter 70 is a wire mesh duplex filter. After filter 70, pump 68 moves the oil through a water cooled liquid-to-liquid heat exchanger 72. The cooled oil then recycles or returns to the condenser 48 via lines 60 and 64 where it is again sprayed onto the topside and underside of the packing 54. A portion of the oil, equal to that condensed in the condenser 48, is removed via line 74 and is a usable end product from the process. Oil line 58 which exits from the upper end 50 of condenser 48 contains oil-having a flash point of about 60° C. or greater, as noted above.

Gases exiting condenser 48 via line 58 are then fed to a second or secondary condenser 76. Condenser 76 is similar to condenser 48, and is a packed tower which is cylindrical in shape having an upper end 78 and a lower end or sump 80. Condenser 76 is also filled with ring packing 82 in its central section which is supported via a screen 84.

Condenser 76 operates in a similar manner to condenser 48 except that the gases entering its lower section at about 105° C. below packing 82 are cooled below the dew point of water. Thus, both water and oil are collected in sump 80 of condenser 76 as a secondary oil fraction. However, the oil collected in sump 80 is of the low-boiling type, i.e. has a flash point of about 34° C. or below and is typically between about 34° C. to about 24° C. and preferably about 30° C. Thus, this oil typically has a specific gravity of 0.90 to 0.95. Since this oil is significantly less dense than water, separation of the oil and water phases and the material collected in sump 80 may be readily accomplished.

As shown in FIG. 2, the oil water mixture collected in sump 80 is drawn from sump 80 via a pump 86 in line 88 through a water cooled liquid-to-liquid heat exchanger 90. The cooled oil returns or is recycled to condenser 76 via line 92 where it is sprayed onto the top of packing 82 via nozzle 94. This oil is used to cool the incoming gases from approximately 105° C. to approximately 49° C. so that gases exiting the upper end 78 of condenser 76 in line 96 contains less then 5% condensable gas vapors. In other words, 95% or greater of the oil contained in gas discharge pipe 18 has been removed and recovered via the system illustrated in FIG. 2. The gases exiting the upper end 78 of tower 76 are referred to herein as the secondary vapor fraction and contain mostly hydrocarbon fuel gases and some condensed oil mist entrained therein. A dermister 100 located in line 96 will remove most of the condensed oil mist entrained in the gas stream passing therethrough via drain line 102. The gas in line 104 exiting demister 100 may then be transported for storage or burned as fuel.

Finally, a portion of the oil being circulated between sump 80 and packing 82, equal to that condensed in tower 76, is removed via line 98 and is recovered as an oil end product from the process. As noted above, the material in line 98 contains both water and oil which is then processed downstream by conventional techniques to separate the water and oil. This oil, however, is what is considered low boiling oil, i.e. that having a flash point of about 34° C. or below.

Thus, a system has been illustrated and described which enables the recovery of usable products from the pyrolysis of used vehicle tires. In particular, a system has been described which avoids the drawbacks of previous systems. By controlling the temperature and size of condensers 48 and 76, and the flow rates of the cooling oil, the temperature of the gas leaving the condensers can be controlled, as can be the composition of the oil and gas end products obtained from this process.

EXAMPLE 1

The following is sample data that may be used to size a 100 ton per day tire pyrolysis plant built in accordance with FIG. 2.

| | |
|---|---|
| Tower 48 | Diameter = 30 inches |
| | Height = 26 feet |
| Feed inlet line 18 | Gas temp. = 850° F. |
| Sump outlet line 57 | Oil temp. = 150° F. |
| Heat exchanger 72 cooling water | Water temp. = 85° F. |
| | Flow rate = 300 gpm |

-continued

| | |
|---|---|
| Oil recycle line 60 | Oil temp. = 90° F. |
| | Flow rate = 175 gpm |
| Tower outlet line 58 | Gas temp. = 212° F. |
| Tower 76 | Diameter = 24 inches |
| | Height = 10 feet |
| Sump outlet line 88 | Oil temp. = 100° F. |
| Heat exchanger 90 cooling water | Water temp. = 85° F. |
| | Flow rate = 70 gpm |
| Oil recycle line 92 | Oil temp. = 90° F. |
| | Flow rate = 85 gpm |
| Tower outlet line 96 | Gas temp. = 100° F. |

EXAMPLE 2

The following is a chart showing the composition of oil collected in a pilot plant study from a system constructed as illustrated in FIG. 2 for two different sources of tires, i.e. Source 1 was from used automobile tires, and Source 2 was from reject or off-spec OEM automobile tires.

| | Distribution (Wt. %) | Viscosity (Centistokes) | Pour Point (° F.) | Conradson Carbon (Wt. %) | Pentane Insolubles (Wt. %) | Specific Gravity | Carbon (Wt. %) | Hydrogen (Wt. %) | Sulfur (Wt. %) | Ash (Wt. %) |
|---|---|---|---|---|---|---|---|---|---|---|
| | | | | Source 1 (used Auto Tires) | | | | | | |
| Primary | 83.5% | 6.27 | −22 | 7.9 | 0.97 | 0.99 | 87.85 | 8.67 | 1.18 | 0.04 |
| Secondary | 2.6% | | | | | 0.95 | | | | |
| Demister | 13.8% | 0.893 | −22 | 1.2 | 0.07 | 0.87 | 86.31 | 9.48 | 0.85 | 0.01 |
| | | | | Source 2 (Off-spec OEM Auto Tires) | | | | | | |
| Primary | 85.2% | 13.10 | −22 | 11.2 | 5.1 | 1.03 | 87.81 | 8.18 | 1.32 | 0.09 |
| Secondary | 4.0% | | | | | 0.97 | | | | |
| Demister | 10.8% | 0.952 | −22 | 1.9 | 0.7 | 0.89 | 87.37 | 9.32 | 0.49 | 0.01 |

EXAMPLE 3

The following is a chart showing a typical non-condensable gas analysis for the product obtained from line 104 in a tire pyrolysis pilot plant constructed as illustrated in FIG. 2.

| Gas Analysis | |
|---|---|
| Component | Wt % |
| $H_2$ | 0.7 |
| $CH_4$ | 13.2 |
| $C_2$'s | 16.5 |
| $C_3$'s | 15.1 |
| $C_4$'s | 26.7 |
| $C_5$'s | 9.5 |
| $C_6+$'s | 14.1 |
| $H_2S$ | 1.1 |
| Carbonyl Sulfide | 0.1 |
| CO | 2.9 |
| Total | 100.0 |
| Heating Value (BTU/lb) | 19,600 |
| (BTU/scf) | 1,700 |

The invention claimed is:

1. A system for recovering oil from the pyrolysis of material containing hydrocarbons, comprising:

a source of pyrolysis gases containing water vapor, hydrocarbon fuel gases, condensable oil and particulate matter;

a primary oil condenser for separating said source of pyrolysis gases into a primary oil fraction containing oil and particulate matter, and a primary vapor fraction containing oil, hydrocarbon fuel gases and water vapor, said primary oil condenser operating at a temperature above the dew point of the water vapor in said source of pyrolysis gases, said primary oil condenser including an inlet for receiving said pyrolysis gases, a first outlet for collecting the primary oil fraction, and a second outlet for collecting the primary vapor fraction; wherein said primary oil condenser is a packed tower having an upper end, a lower end and a central portion filled with packing, and further including at least one upper spray nozzle disposed above said packing and directed to spray oil downwardly onto said packing, at least one lower spray nozzle disposed beneath said packing and directed to spray oil upwardly toward said packing, and a pump for pumping a portion of said primary oil fraction from said first outlet of said primary oil condenser to said upper and lower spray nozzles; and a secondary oil condenser for separating said primary vapor fraction into a secondary oil fraction containing oil and water, and a secondary vapor fraction containing hydrocarbon fuel gases, said secondary oil condenser operating at a temperature below the dew point of the water vapor in said primary vapor fraction, said secondary oil condenser including an inlet for receiving said primary vapor fraction, a first outlet for collecting the secondary oil fraction, and a second outlet for collecting the secondary vapor fraction.

2. The system of claim 1 wherein said primary oil fraction has a flash point of about 60° C. or higher.

3. The system of claim 1 wherein said secondary oil fraction has a flash point of about 34° C. or below.

4. The system of claim 1 wherein said secondary oil fraction has a specified gravity of about 0.90 to about 0.95.

5. The system of claim 1 further including a tertiary oil separator for removing condensed oil mist entrained in said secondary vapor fraction to provide a tertiary oil fraction and a tertiary vapor fraction.

6. The system of claim 5 wherein said tertiary oil separator is a demister.

7. The system of claim 1 further including a filter disposed between said pump and the first outlet of said primary oil condenser to remove particulate matter from said primary oil fraction.

8. The system of claim 1 further including a heat exchanger disposed between said pump and said nozzles to cool said primary oil fraction prior to being sprayed onto said packing.

9. The system of claim 1 wherein said secondary oil condenser is a packed tower having an upper end, a lower end and a central portion filled with packing.

10. The system of claim 9 further including means for recycling a portion of said secondary oil fraction to said packed tower to condense the oil and water in said primary vapor fraction.

11. The system of claim 9 further including at least one upper spray nozzle disposed above said packing and directed to spray oil downwardly onto said packing, and a pump for pumping a portion of said secondary oil fraction from said first outlet of said secondary oil condenser to said upper spray nozzle.

12. The system of claim 11 further including a heat exchanger disposed between said pump and said upper nozzle to cool said secondary oil fraction prior to being sprayed onto said packing.

* * * * *